(12) United States Patent
Takao

(10) Patent No.: US 7,686,271 B2
(45) Date of Patent: Mar. 30, 2010

(54) DISPLAY DEVICE

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/021,073

(22) Filed: Jan. 28, 2008

(65) Prior Publication Data
US 2008/0179483 A1 Jul. 31, 2008

(30) Foreign Application Priority Data
Jan. 31, 2007 (JP) ............................. 2007-022070

(51) Int. Cl.
*A47G 29/00* (2006.01)
(52) U.S. Cl. ................... 248/371; 248/917; 248/919; 248/923
(58) Field of Classification Search ......... 248/917–923, 248/371, 398, 158
See application file for complete search history.

(56) References Cited

U.S. PATENT DOCUMENTS

2005/0041379 A1* 2/2005 Jang ........................... 361/681
2006/0175476 A1* 8/2006 Hasegawa et al. ......... 248/125.1
2006/0187625 A1* 8/2006 Jung et al. .................. 361/681
2007/0205340 A1* 9/2007 Jung ......................... 248/125.9

FOREIGN PATENT DOCUMENTS

| JP | 64-120 U | 1/1989 |
| JP | 05-38644 U | 5/1993 |
| JP | 2571346 Y2 | 2/1998 |
| JP | 2001-194648 | 7/2001 |
| JP | 2004-112234 | 4/2004 |

* cited by examiner

*Primary Examiner*—Amy J Sterling
(74) *Attorney, Agent, or Firm*—Pillsbury Winthrop Shaw Pittman, LLP

(57) ABSTRACT

According to one embodiment, a display device is provided with a body, a stand to support the body, and an adjustment system which is arranged between the body and the stand and adjusts the tilt of the body. The adjustment system has a first positioning portion and a second positioning portion which is arranged independent from the first positioning portion. The first positioning portion determines the position of the body on the stand. The second positioning portion has the first positioning portion function as a pivot point to rotate the body in a predetermined angle with respect to the stand to determine the position of the body on the stand in the predetermined rotated angle.

10 Claims, 11 Drawing Sheets

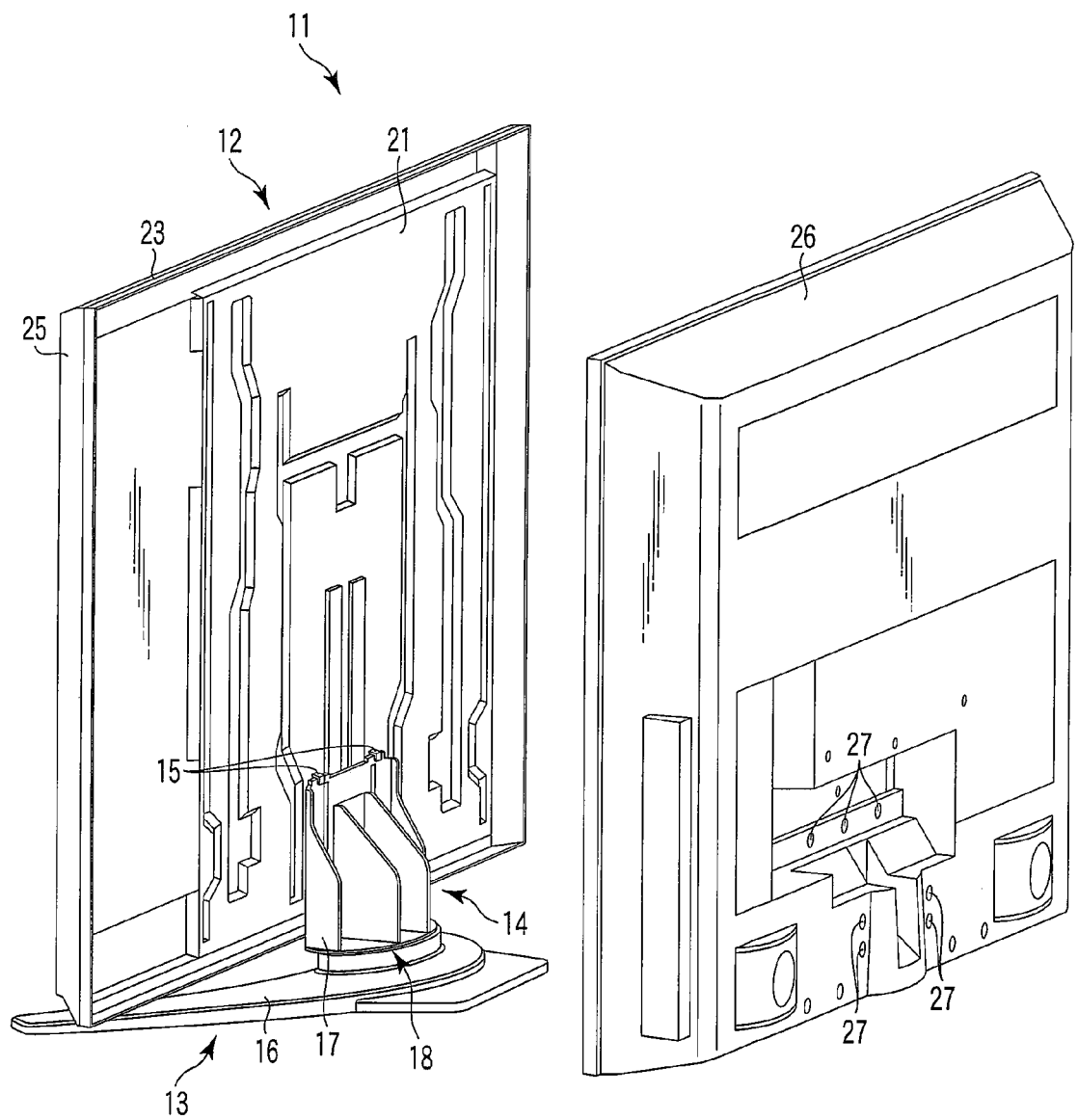
F I G. 2

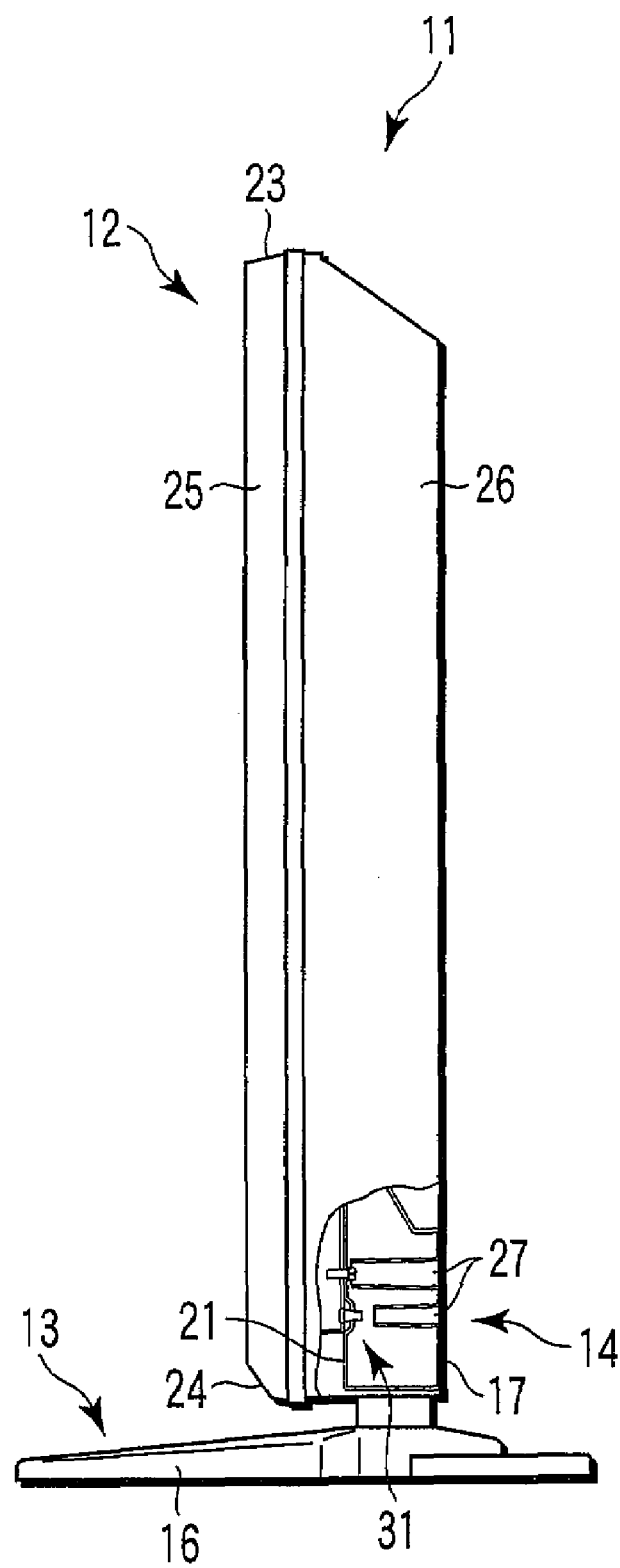
F I G. 3

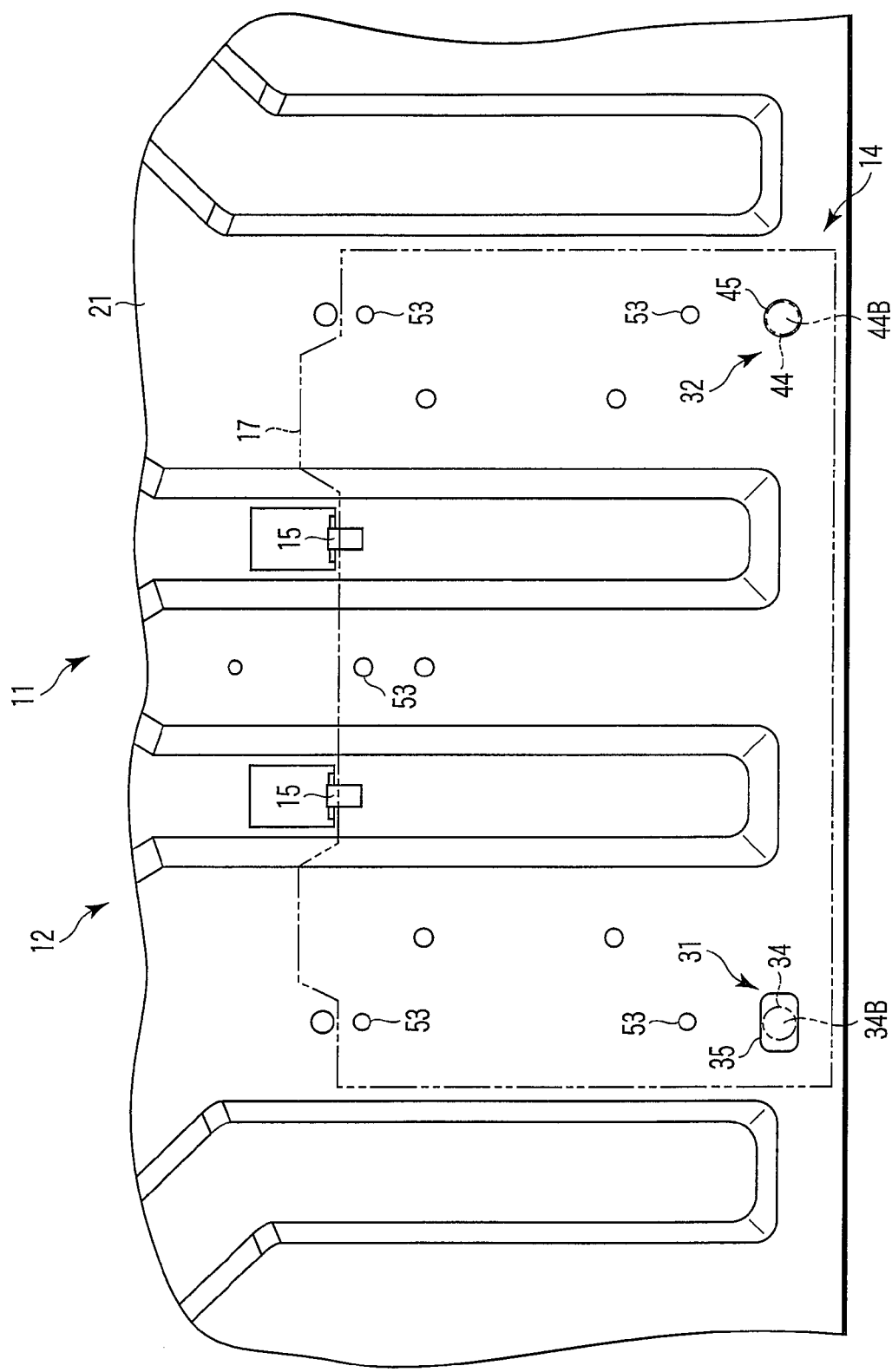
F I G. 6

ABSTRACT
DISPLAY DEVICE

CROSS-REFERENCE TO RELATED APPLICATIONS

This application is based upon and claims the benefit of priority from Japanese Patent Application No. 2007-022070, filed Jan. 31, 2007, the entire contents of which are incorporated herein by reference.

BACKGROUND

1. Field

One embodiment of the present invention relates to a display device which is capable of adjusting the tilt of a body.

2. Description of the Related Art

For example, Japanese Patent Application Publication KOKAI No. 2004-112234 discloses a flat-screen display device provided with an adjustment system to maintain a display screen in a horizontal position. This flat-screen display device is provided with a screen portion, a stand to support the screen portion, and an attaching member to attach the screen portion and the stand. The attaching member includes a positioning pin to position the screen portion on the stand, a clamp hole to screw the screen portion on the stand, and a position adjustable hole to adjust the attaching position of the screen portion and the stand. The flat-screen display device is further provided with an eccentric cam. Details of the structure supporting this eccentric cam are unclear.

In this flat-screen display device, the position between the screen portion and the stand is roughly determined through the positioning pin. The eccentric cam is inserted into the position adjustable hole and is rotated, thereby rotating the screen portion with respect to the stand. At this point, a screw screwed into the clamp hole becomes a pivot point to rotate the screen portion.

However, with the above conventional flat-screen display device, it is uncertain as to whether there would be enough rotation amount for the screen portion since the screen portion was made rotatable through the eccentric cam after its position was roughly determined by the positioning pin. Further, generally, in most cases a clamp hole for a screw cramp is formed with allowance in consideration of tolerance etc. Therefore, when a screw functions as a pivot point to rotate the screen portion, there is a possibility that the screw itself being the pivot shaft may move up and down, thereby causing insufficient rotation amount about the pivot shaft. Furthermore, in the structure of the above conventional flat-screen display device, the weight of the screen portion is placed on the eccentric cam when rotating the eccentric cam. However, no treatment is applied to help the rotation of the eccentric cam.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary perspective view illustrating the flat-screen television shown in FIG. 1 with its back cover removed.

FIG. 3 is an exemplary section view illustrating a vertical section of a part of the flat-screen television shown in FIG. 1.

FIG. 6 is an exemplary rear elevation illustrating a part of a plate of the body of the flat-screen television shown in FIG. 2.

DETAILED DESCRIPTION

Various embodiments according to the invention will be described hereinafter with reference to the accompanying drawings. In general, according to one embodiment of the invention, the display device is provided with a body, a stand to support the body, and an adjustment system which is arranged between the body and the stand and adjusts the tilt of the body. The adjustment system has a first positioning portion and a second positioning portion which is arranged independent from the first positioning portion. The first positioning portion determines the position of the body on the stand. The second positioning portion has the first positioning portion function as a pivot point to rotate the body in a predetermined angle with respect to the stand to determine the position of the body on the stand in the predetermined rotated angle.

As an example of the display device, an embodiment of a flat-screen television will be explained in reference to FIGS. 1 to 9.

Figure 1:
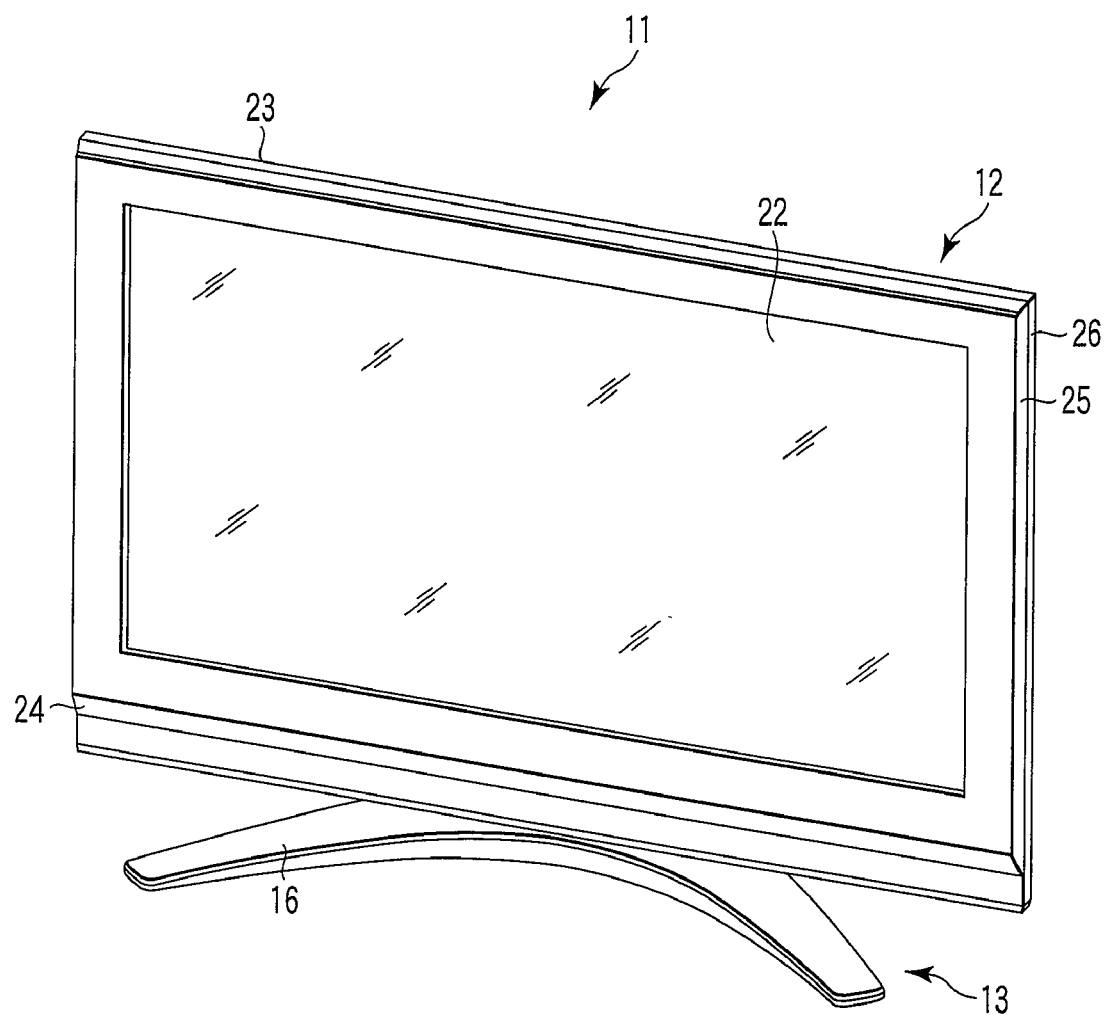
FIG. 1 is an exemplary perspective view of a flat-screen television according to a first embodiment of a display device.

As illustrated in FIGS. 1 to 3, the flat-screen television 11 is provided with a body 12, a stand 13 which supports the body 12, an adjustment system 14 which is provided between the body 12 and the stand 13 and can adjust the tilt of the body 12, and a hook mechanism 15 to tentatively fix the body 12 on the stand 13. The stand 13 has an arch shaped leg 16, a fixing portion 17 which extends from the leg 16 and to which the body 12 is attached, and a hinge mechanism 18 which supports the fixing portion 17 to rotate in a horizontal direction. The hook mechanism 15 is a pair of hooks provided on the left side and right side. The fixing portion 17 is, for instance, formed by bending a metal plate which has a thickness of 3 mm.

The body 12 has a frame 21, a liquid crystal panel 22 fixed on the frame 21, a printed circuit board, which is not illustrated, to drive the liquid crystal panel 22, a cabinet 23 to enclose the above items, and a speaker 24 provided on the cabinet 23. For instance, the frame 21 is formed by pressing a metal plate which has a thickness of 2 mm. The cabinet 23 includes a front cover 25 and a back cover 26. The back cover 26 has a plurality of apertures 27. The plurality of apertures 27 exteriorly expose each of a first pin 34 of a first positioning portion 31, a second pin 44 of a second positioning portion 32, and a plurality of screws 28 for fixing the body 12 on the stand 13. In other words, the back cover 26 is arranged apart from the first positioning portion 31, the second positioning portion 32, and the plurality of screws 28.

Figure 9:
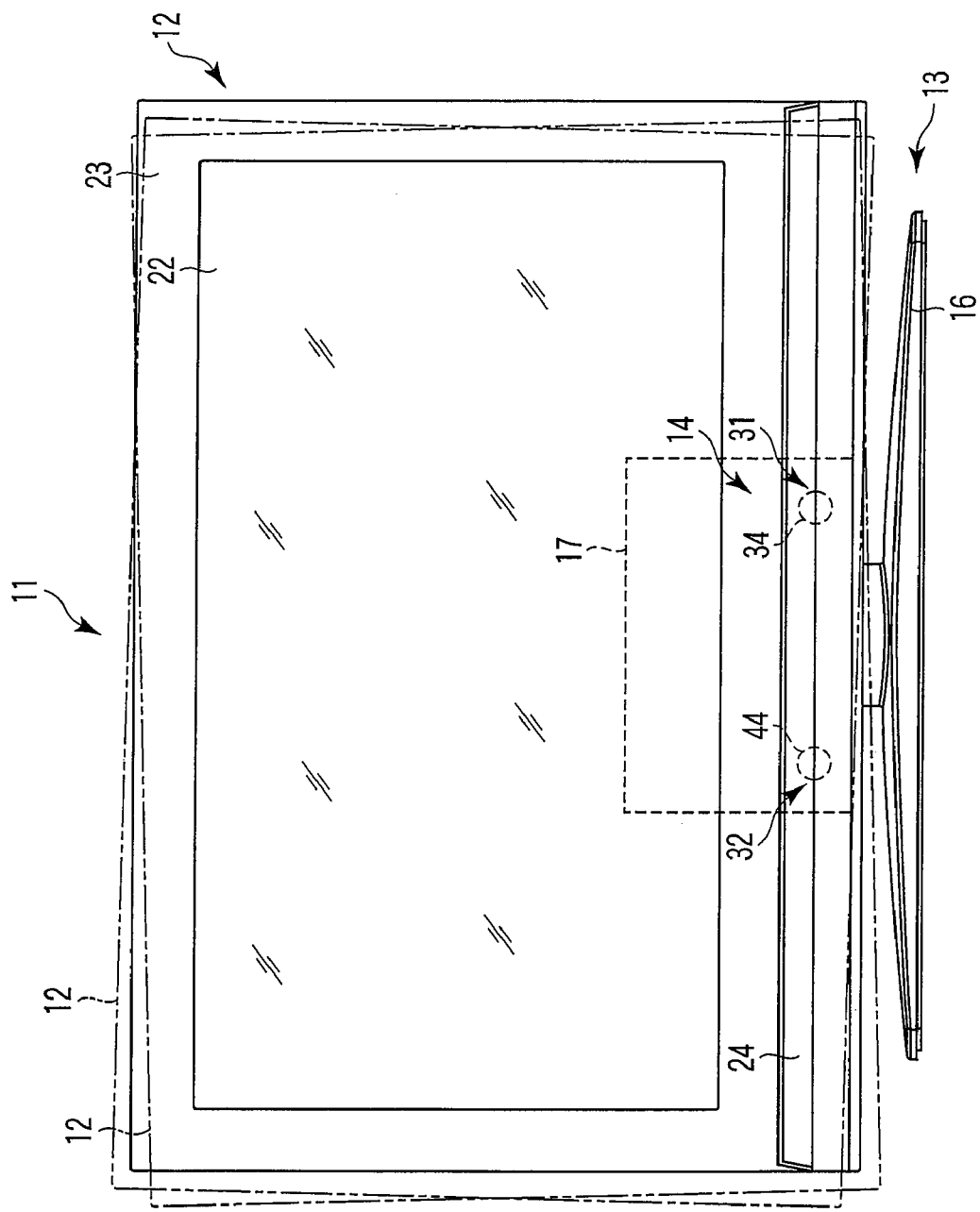
FIG. 9 is an exemplary elevation illustrating the movement of the body of the flat-screen television shown in FIG. 1.

As illustrated in FIG. 9, the adjustment system 14 has the first positioning portion 31 for positioning the body 12 on the stand 13, and the second positioning portion 32 which makes the first positioning portion 31 function as a pivot point for rotating the body 12 in a predetermined angle with respect to the stand 13.

Figure 4:
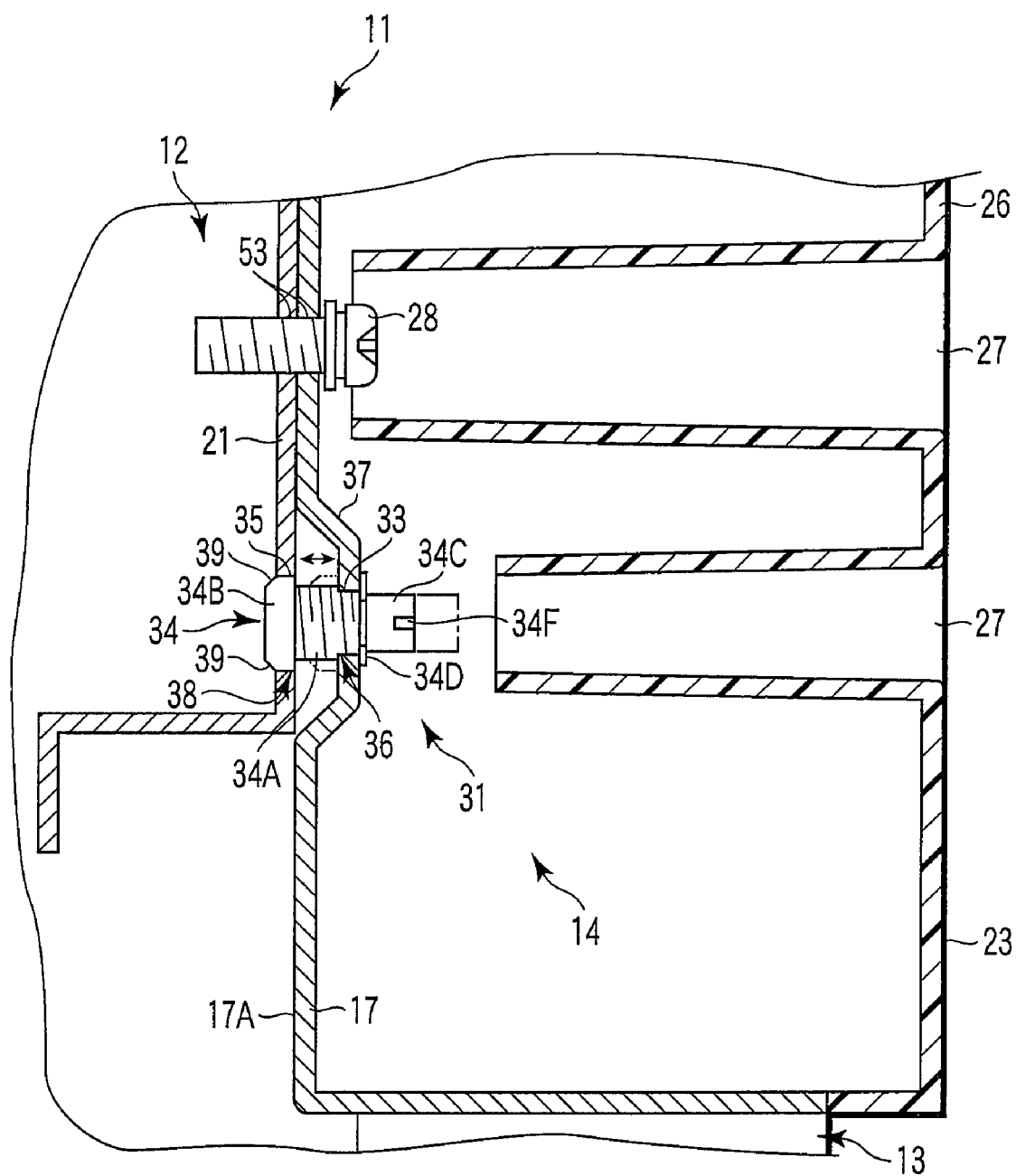
FIG. 4 is an exemplary section view illustrating an enlarged portion of the part of the flat-screen television shown in FIG. 3.

As illustrated in FIGS. 4 and 6, the first positioning portion 31 has a first bearing 33 which is provided on the fixing portion 17 of the stand 13, a first pin 34 which penetrates the first bearing 33, a first aperture 35 which is provided on the frame 21 of the body 12, a first screw mechanism 36 which is provided between the first bearing 33 and the first pin 34, and a first concave portion 37 which is formed around the first bearing 33. The first bearing 33 is a screw hole, which has a female thread formed on its inner circumference. A first thread part 34A of the first pin 34 can be screwed into the first bearing 33.

As shown in FIG. 6, the first aperture 35 is formed in the shape of a long hole. The first aperture 35 is wider in a lateral direction, i.e. in a horizontal direction. The first aperture 35 is capable of tolerating variations in the pitch between the first positioning portion 31 and the second positioning portion 32 when a second cam portion 44B, which is eccentric as will be explained later, is rotated. The size of the first aperture 35 in a lengthwise direction is approximately the same as the diameter of a first cam portion 34B of the first pin 34, though it may have slight clearance with the first cam portion 34B. Therefore, the first cam 34B fits in tightly in the vertical direction and can slide in the lateral direction with respect to the first aperture 35. Further, in the present embodiment, the first aperture 35 is configured as a long hole, which is a through-hole. However, this is not restricted. Therefore, the first aperture 35 may be configured as, for instance, a concave portion which does not penetrate the frame 21.

Figure 7:
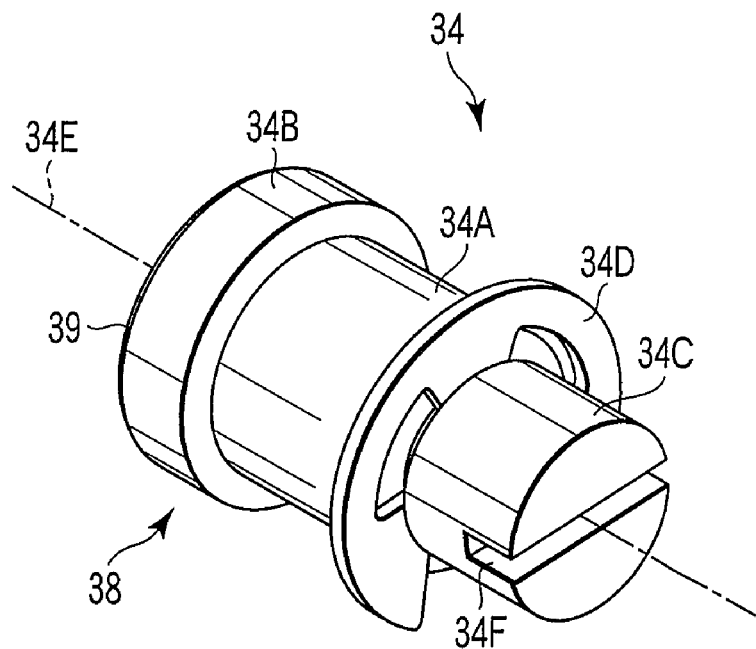
FIG. 7 is an exemplary perspective view illustrating a first pin of a first positioning portion shown in FIG. 4.

As shown in FIG. 7, the first pin 34 includes the first thread part 34A, the first cam portion 34B which is arranged on one end of the first thread part 34A, a first shank 34C which is arranged on the other end of the first thread part 34A, and a first stopper 34D which is arranged between the first thread part 34A and the first shank 34C. The first thread part 34A is configured by a external thread which is complementary to the first bearing 33. The first screw mechanism 36 allows the first pin 34 to progress and retreat in an axial direction with respect to the first bearing 33. The first cam portion 34B and the first stopper 34D comprise a first retaining portion 38. The first retaining portion 38 prevents the first pin 34 from falling off the first bearing 33 when the first pin 34 moves back and forth through the bearing 33.

The first cam portion 34B is arranged so that it becomes concentric with a central axis 34E of the first pin 34. The first cam portion 34B is plate-shaped. The first cam portion 34B has a first chamfered portion 39 which is formed by chamfering the edge of the surface, facing the first aperture 35, of the first cam portion 34B. The first cam portion 34B engages with the first aperture 35.

As shown in FIG. 4, the first concave portion 37 is formed concavely with respect to an anterior surface 17A of the fixing portion 17 of the stand 13. The first bearing 33 is arranged at the bottom of the first concave portion 37. The depth of the first concave portion 37 is approximately the same as the height of the first cam portion 34B. As shown in the chain double-dashed line in FIG. 4, when the first pin 34 retreats and the first cam portion 34B disengages from the first aperture 35, the first concave portion 37 is able to accommodate the first cam portion 34B.

Figure 5:
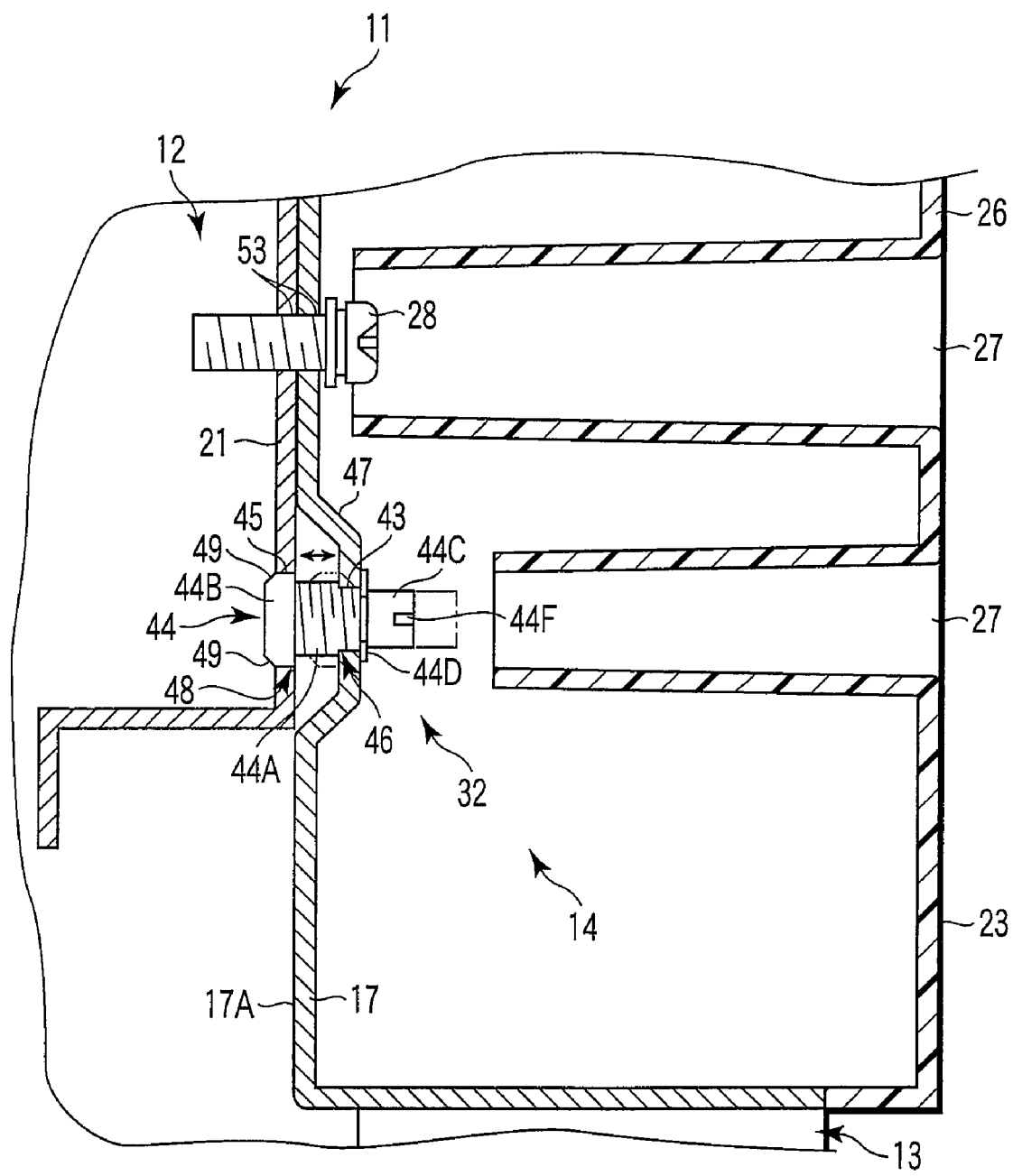
FIG. 5 is an exemplary section view illustrating a vertical section of a second positioning portion of the flat-screen television shown in FIG. 3.

As shown in FIGS. 5 and 6, the second positioning portion 32 is arranged independent from, i.e. separately from, the first positioning portion 31. The second positioning portion 32 can determine the position of the body 12 with respect to the stand 13, in a state where the body 12 is rotated in a predetermined angle by the first positioning portion 31 functioning as a pivot point.

More specifically, the second positioning portion 32 has a second bearing 43 provided on the stand 13, a second pin 44 which penetrates the second bearing 43, a second aperture 45 which is provided on the frame 21 of the body 12, a second screw mechanism 46 which is provided between the second bearing 43 and the second pin 44, and a second concave 47 which is formed around the second bearing 43. The second bearing 43 is a screw hole, which has a female thread formed on its inner circumference. A second thread part 44A of the second pin 44 can be screwed into the second bearing portion 43.

As shown in FIG. 6, the second aperture 45 is formed in the shape of a circular hole to which a second cam portion 44B of the second pin 44 fits in. The size of the second aperture 45 in the vertical and horizontal directions is approximately the same as the diameter of the second cam portion 44B, though there may be slight clearance with the second cam portion 44B. Therefore, the second cam portion 44B fits in tightly in the second aperture 45 with respect to the vertical and horizontal directions. Further, in the present embodiment, the second aperture 45 is configured as a circular through-hole. However, this is not restricted. Therefore, the second aperture 45 may also be configured as, for instance, a concave portion which does not penetrate the frame 21.

Figure 8:
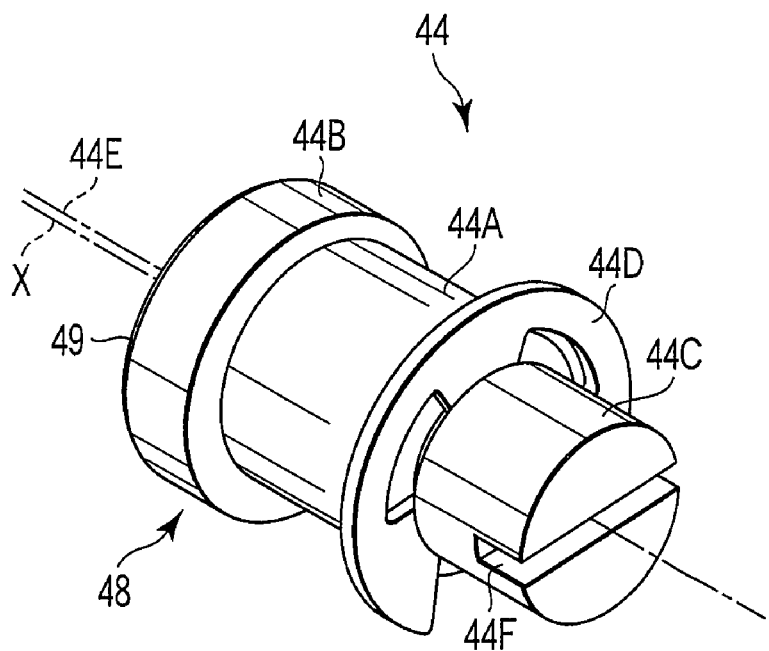
FIG. 8 is an exemplary perspective view illustrating a second pin of the second positioning portion shown in FIG. 5.

As shown in FIG. 8, the second pin 44 includes a second thread part 44A, a second cam portion 44B which is provided at one end of the second thread part 44A, a second shank 44C which is provided at the other end of the second thread part 44A, and a second stopper 44D which is provided between the second thread part 44A and the second shank 44C. The second thread part 44A is configured by a external thread which is complementary to the second bearing 43. The second screw mechanism 46 allows the second pin 44 to progress and retreat in the axial direction with respect to the second bearing 43. The second cam portion 44B and the second stopper 44D comprise a second retaining portion 48. The second retaining portion 48 prevents the second pin 44 from falling off the second bearing 43 when the second pin 44 moving back and forth through the second bearing 43.

The second cam portion 44B is provided eccentrically with respect to a center axis 44E of the second pin 44. In other words, a center axis X of the second cam portion 44B is arranged slightly misaligned with respect to the center axis 44E of the second pin 44. The second cam portion 44B is plate-shaped. The second cam portion 44B has a second chamfered portion 49 which is formed by chamfering the edge of the surface, facing the second aperture 45, of the second cam portion 44B. The second cam portion 44B engages with the second aperture 45.

As shown in FIG. 5, the second concave portion 47 is formed concavely with respect to the anterior surface 17A of the fixing portion 17. The depth of the second concave portion 47 is approximately the same as the height of the second cam portion 44B. The second bearing 43 is arranged at the bottom of the second concave portion 47. Therefore, as shown in the chain double-dashed line in FIG. 5, when the second pin 44 retreats and the second cam portion 44B disengages from the second aperture 45, the second concave portion 47 accommodates the second cam portion 44B.

Subsequently, an assembly process of the flat-screen television 11 will be explained with reference to FIG. 9. When the flat-screen television 11 is cardboard packaged, it is separated into the body 12 and the stand 13. When using the flat-screen television 11, a user assembles the flat-screen television 11 by mounting the body 12 on the stand 13. This is done by placing the body 12 on the upper part of the stand 13, then, by hooking the hook mechanism 15 of the body 12 onto the upper side of the fixing portion 17. In this state, after mounting the body 12 readily on the stand 13, each of the five pieces of screws 28 are lightly screwed into the through-holes 53 arranged on, for instance, five locations on the fixing portion 17 and the frame 21. In such state, for instance, a minus screwdriver is inserted into a first groove 34F of the first pin 34 to rotate the first pin 34 and actuate the first positioning portion 31.

When the first pin 34 is rotated clockwise, the first pin 34 rotates about the center axis 34E and moves forward toward the front of the flat-screen television 11. In such manner, the first cam portion 34B of the first pin 34 engages with the first aperture 35 of the body 12. Subsequently, when rotating the second pin 44 clockwise by, for example, inserting a minus screwdriver into a second groove 44F of the second pin 44, the second pin 44 rotates about the center axis 44E and moves forward toward the front of the flat-screen television 11. At this point, by engaging the second cam portion 44B of the second pin 44 with the second aperture 45 of the body 12, the first positioning portion 31 and the second positioning portion 32 determines the position of the body 12 on the stand 13.

When the second cam portion 44B of the second pin 44 is inserted into the second aperture 45, the first pin 34 functions as a pivot point to rotate the body 12 in a predetermined angle as shown by the chain double-dashed line in FIG. 9. In this manner, the user adjusts the second pin 44 in a desired position so as to horizontalize the body 12. The first and second positioning portions 31 and 32 determine the position of the body 12 on the stand 13, in a state where the body 12 is modified horizontally by a desired angle rotation. Finally, the five pieces of screws 28 are completely screwed in, thereby completing the assembly process.

Meanwhile, the body 12 can be removed from the stand 13 by disassembling them in the opposite procedure of the above. In other words, for instance, by rotating the first pin 34 counter-clockwise, the first cam portion 34B disengages from the first aperture 35 while rotating about the center axis 34E. By rotating the second pin 44, for instance, counter-clockwise, the second cam portion 44B disengages from the second aperture 45 while rotating about the center axis 44E.

According to the first embodiment, the adjustment system 14 has the first positioning portion 31, which determines the position of the body 12 with respect to the stand 13, and the second positioning portion 32, which is arranged independent from the first positioning portion 31, makes the first positioning portion 31 function as a pivot point to rotate the body 12 in a predetermined angle with respect to the stand 13, and determines the position of the body with respect to the stand 13 in the state of the above rotation. According to this structure, the first positioning portion 31 and the second positioning portion 32 can function as both, to determine the position of the body 12 with respect to the stand 13, and to adjust the angle of the body 12. Therefore, the structure can be simplified as there is no need to provide a mechanism separately for adjusting the angle of the body 12.

In this case, the first pin 34 can move back and forth in the direction of the axis. The first cam portion 34B, which is concentric with the center axis 34E, engages with or disengages from the first aperture 35 while rotating about the center axis 34E. According to this structure, since the first cam portion 34B is rotatable, even when there is a gap between the positions of the first cam portion 34B and the first aperture 35, it becomes easier for the first cam portion 34B to be engaged with the first aperture 35. In addition, since the first bearing 33 supports the first pin 34, which functions as the pivot point axis when rotating the body 12, the first pin 34 can be prevented from moving up, down, left and right. Therefore, the first pin 34 can be inserted efficiently into the first aperture 35.

In such case, the second pin 44 is able to move back and forth in the axial direction. The second cam portion 44B, which is eccentric with respect to the center axis 44E, engages with and disengages from the second aperture 45 while rotating about the center axis 44E. According to this structure, when the second pin 44 is rotated in a state where the second cam portion 44B is engaged with the second aperture 45, the first positioning portion 31 functions as a pivot point to rotate the body 12 in a predetermined angle. Therefore, the mounting angle of the body 12 can be simply adjusted by setting the angle of the second cam portion 44B in a desired position. Especially, in the present embodiment, the first pin 34 and the first bearing portion 33 comprise the pivot point axis for rotating the body 12. Therefore, the amount of movement of the first pin 34 becomes small. Because of this, even if the eccentric amount of the second cam portion 44B is small, it is possible to obtain a sufficient rotation angle of the body 12. Further, since the second cam portion 44B will do with a small size, the power to rotate the second pin 44 can be minimized.

Further, since the second cam portion 44B rotates while engaging with and disengaging from the second aperture 45, the second cam portion 44B can be easily engaged with the second aperture 45 even when there is a gap between the positions of the second cam portion 44B and the second aperture 45.

In this case, the edge of the surface of the first cam portion 34B facing the first aperture 35 is chamfered. According to this structure, the first cam portion 34B can be easily engaged with the first aperture 35 when inserting the first pin 34 into the first aperture 35.

In this case, the edge of the surface of the second cam portion 44B facing the second aperture 45 is chamfered. According to this structure, the second cam portion 44B can be easily engaged with the second aperture 45 when inserting the second pin 44 into the second aperture 45.

In this case, the first positioning portion 31 comprises the first screw mechanism 36 which is arranged between the first pin 34 and the first bearing 33. The first screw mechanism 36 makes the first pin 34 progress and retreat with respect to the first bearing 33. According to this structure, the first pin 34 which progresses and retreats while rotating can be easily configured. In addition, since each screw thread of the first screw mechanism 36 is capable of maintaining the first pin 34 receiving the weight of the body 12, the first pin 34 can be rotated easily without moving to the left, right, up and down when rotated.

In this case, the second positioning portion 32 comprises the second screw mechanism 46 which is arranged between the second pin 44 and the second bearing 43. The second screw mechanism 46 makes the second pin 44 progress and retreat with respect to the second bearing 43. According to this structure, the second pin 44 which progresses and retreats while rotating can be easily configured. In addition, it will facilitate the fine adjustment of the position of the second cam portion 44B, and the mounting angle of the body 12 can be amended accurately. Further, since each screw thread of the second screw mechanism 46 is capable of maintaining the second pin 44 receiving the weight of the body 12, the second pin 44 can be rotated easily without moving to the left, right, up and down when rotated.

In this case, the first positioning portion 31 comprises the first concave portion 37, which has the first bearing 33 arranged at the bottom. The depth of the first concave portion 37 is approximately the same as the height of the first cam portion 34B. According to this structure, when the first cam portion 34B disengages from the first aperture 35, the first concave portion 37 can accommodate the first cam portion 34B. Therefore, for instance, when removing the body 12 from the stand 13 so as to hang it up on a wall, it may prevent the second cam portion 34B from disturbing such conduct.

In this case, the second positioning portion 32 comprises the second concave portion 47, which has the second bearing 43 arranged at the bottom. The depth of the second concave portion 47 is approximately the same as the height of the second cam portion 44B. According to this structure, when the second cam portion 44B disengages from the second aperture 45, the second concave 47 can accommodate the second cam portion 44B. Therefore, for instance, when removing the body 12 from the stand 13 so as to hang it up on a wall, it may prevent the second cam portion 44B from disturbing such conduct.

In this case, the first pin 34 includes the first retaining portion 38, which prevents the first pin 34 from falling off the first bearing 33. According to this structure, since the first pin 34 does not become disengaged from the first bearing 33, when, for instance, the body 12 is hung on a wall, the first pin 34 can be prevented from becoming lost.

In this case, the second pin 44 includes the second retaining portion 48, which prevents the second pin 44 from falling off the second bearing 43. According to this structure, since the second pin 44 can be prevented from disengaging from the second bearing 43, the second pin 44 can be prevented from becoming lost.

In this case, the body comprises the front cover 25 and the back cover 26. The back cover 26 is arranged apart from the first positioning portion 31 and the second positioning portion 32. According to this structure, since the user can access the first positioning portion 31 and the second positioning portion 32 without removing the back cover 26, the mounting angle of the body 12 can be adjusted by simply and rapidly operating the first positioning portion 31 and the second positioning portion 32. Further, when hanging the body 12 on the wall, the five pieces of screws 28 can be removed, the first pin 34 can be released from the first aperture 35, and the second pin 44 can be released from the second aperture 45, without removing the back cover 26.

Figure 10:
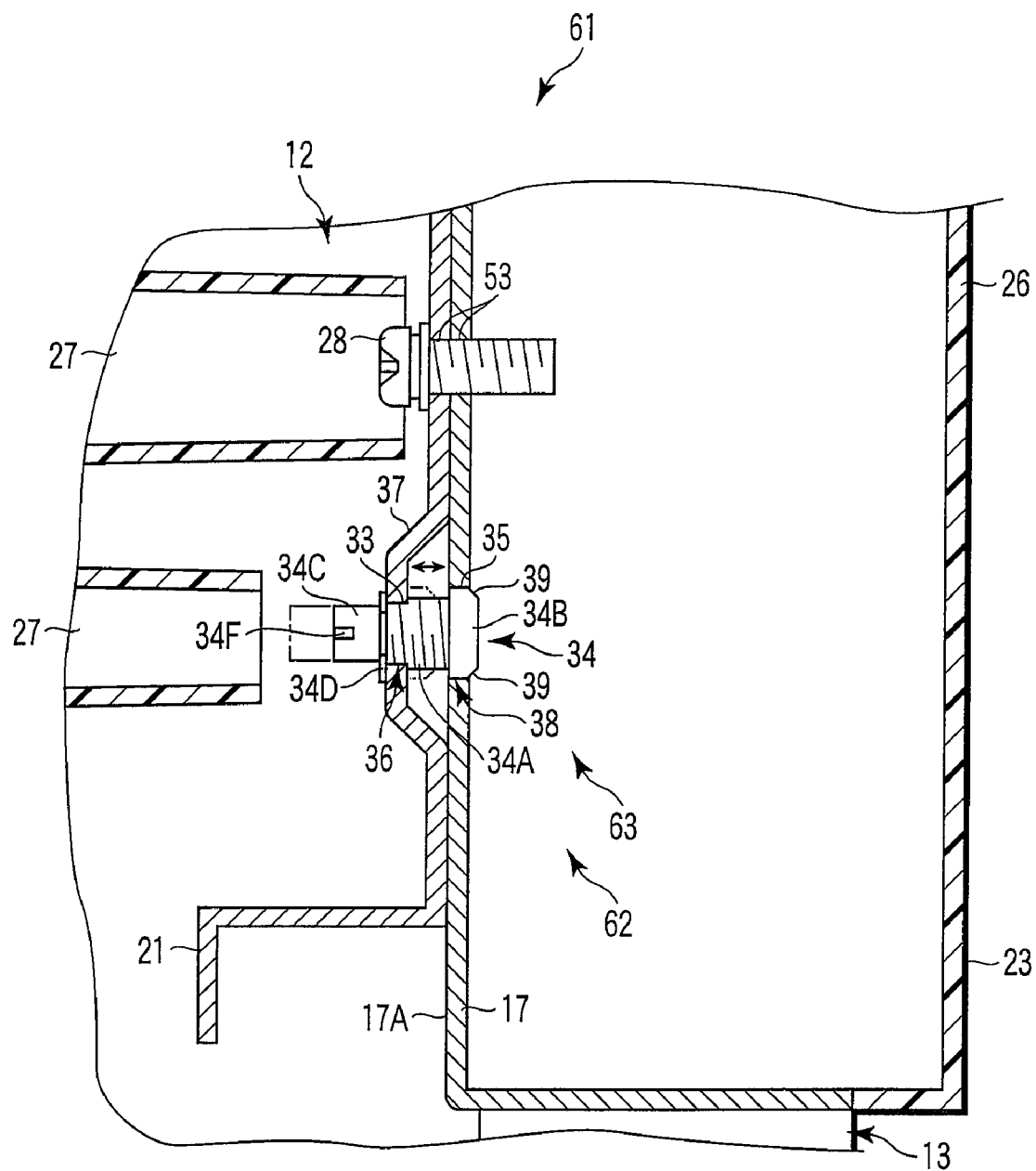
FIG. 10 is an exemplary section view illustrating a vertical section of the flat-screen television according to a second embodiment of the display device.
Figure 11:
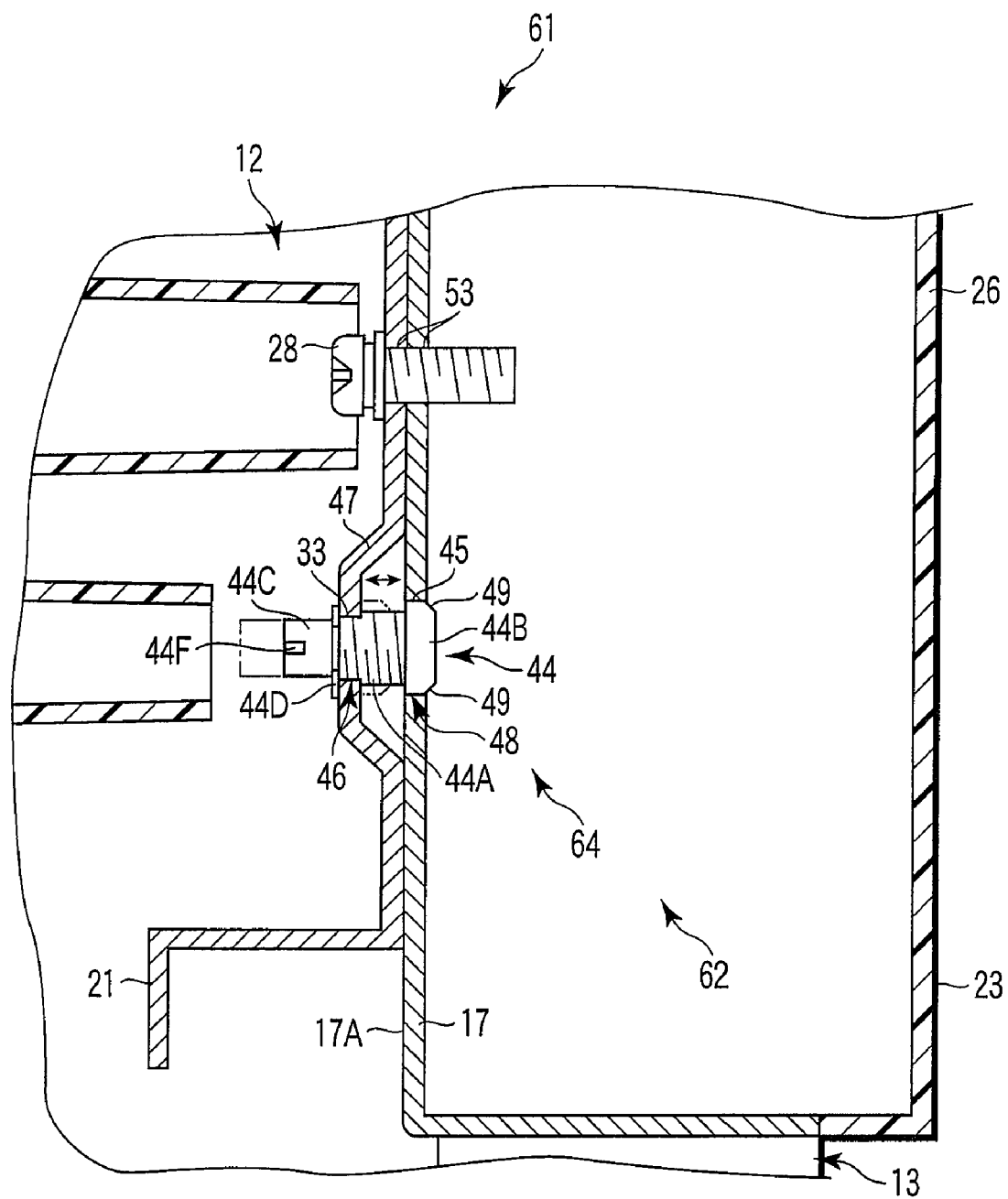
FIG. 11 is an exemplary section view illustrating a vertical section of the second positioning portion of the flat-screen television shown in FIG. 10.
Figure 12:
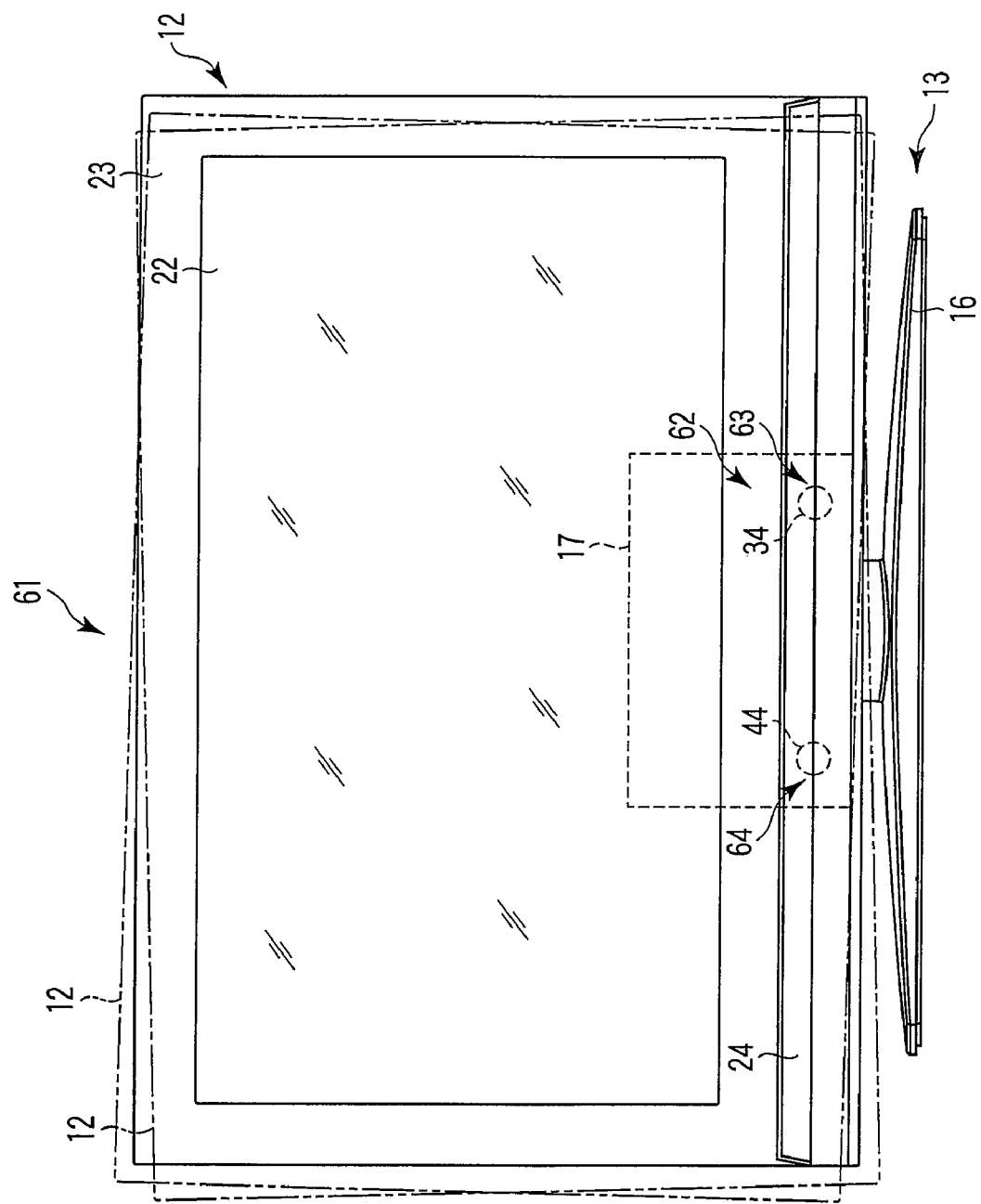
FIG. 12 is an exemplary elevation illustrating the movement of the body of the flat-screen television shown in FIG. 10.

With reference to FIGS. 10 to 12, a second embodiment of the flat-screen television will be explained as an example of the display device. In the second embodiment, all parts are in common with the first embodiment except for a first positioning portion 63 and a second positioning portion 64 of an adjustment system 62 of a flat-screen television 61. Therefore, explanations will be given for portions which are mainly different. Explanations will be omitted for portions in common with the first embodiment. Portions in common will be given common symbols as the first embodiment.

As shown in FIG. 10, the first positioning portion 63 comprises the first bearing 33 which is provided on the frame 21 of the body 12, the first pin 34 which penetrates the first bearing 33, the first aperture 35 which is provided on the fixing portion 17 of the stand 13, the first screw mechanism 36 which is provided between the first bearing 33 and the first pin 34, and the first concave portion 37 which is formed around the first bearing 33. The first bearing 33 is a screw hole, which has a female thread formed on its inner circumference. The first thread part 34A of the first pin 34 can be screwed into the first bearing 33.

The first aperture 35 is formed in a shape of a long hole, which is the same shape as the first aperture 35 in the first embodiment shown in FIG. 6. In other words, the first aperture 35 is wider in a horizontal direction. The size of the first aperture 35 in a lengthwise direction is approximately the same as the diameter of a first cam portion 34B of the first pin 34, though it has slight clearance with the first cam portion 34B. Therefore, the first cam 34B fits in tightly in the vertical direction and can slide in the lateral direction with respect to the first aperture 35. Further, in the present embodiment, the first aperture 35 is configured by a long hole, which is a through-hole. However, this is not restricted. Therefore, it can be configured by, for instance, a concave portion which does not penetrate the fixing portion 17 of the stand 13.

The first pin 34 has the same configuration as that of the first embodiment. As shown in FIG. 10, the first pin 34 includes the first thread part 34A, the first cam portion 34B which is provided at one end of the first thread part 34A, the first shank 34C which is provided on the other end of the first thread part 34A, and the first stopper 34D which is provided between the first thread part 34A and the first shank 34C.

The first cam portion 34B is provided so as to become concentric with the center axis 34E of the first pin 34. The first cam portion 34B is plate-shaped. The first cam portion 34B has the first chamfered portion 39 which is formed by chamfering the edge of the surface, facing the first aperture 35, of the first cam portion 34B. The first cam portion 34B engages with the first aperture 35.

As shown in FIG. 10, the first concave portion 37 is formed concavely on the back surface of frame 21 of the body 12. The depth of the first concave portion 37 is approximately the same as the height of the first cam portion 34B. The first bearing 33 is arranged at the bottom of the first concave portion 37. As shown in the chain double-dashed line in FIG. 10, when the first pin 34 progresses and the first cam portion 34B disengages from the first aperture 35, the first concave portion 37 accommodates the first cam portion 34B.

As shown in FIG. 12, the second positioning portion 64 is provided independent from, i.e. separately from, the first positioning portion 63. As shown in FIG. 11, the second positioning portion 64 has the second bearing 43 which is provided on the frame 21 of the body 12, the second pin 44 which penetrates the second bearing 43, the second aperture 45 which is provided on the fixing portion 17 of the stand 13, the second screw mechanism 46 which is provided between the second bearing 43 and the second pin 44, and the second concave portion 47 which is formed around the second bearing 43. The second bearing 43 is a screw hole, which has a female thread formed on its inner circumference. The second thread part 44A of the second pin 44 can be screwed into the second bearing 43.

The second aperture 45 is formed in the same configuration as the second aperture 45 in the first embodiment shown in FIG. 6. The second aperture 45 is formed in the shape of a circular hole to which the second cam portion 44B of the second pin 44 can be fit in. Although there may be a slight clearance, the size of the second aperture 45 in the lengthwise and crosswise directions is approximately the same as the diameter of the second cam portion 44B of the second pin 44. Therefore, the second cam 44B engages tightly with the second aperture 45 in the lengthwise and crosswise directions. Further, in the present embodiment, the second aperture 45 is configured as a circular hole, which is a through-hole. However, this is not restricted. Therefore, the second aperture 45 may be configured as, for instance, a concave portion which does not penetrate the fixing portion 17 of the stand 13.

The second pin 44 has the same configuration as that of the first embodiment. As shown in FIG. 11, the second pin 44 includes the second thread part 44A, the second cam portion 44B which is provided at one end of the second thread part 44A, the second shank 44C which is provided at the other end of the second tread part 44A, and the second stopper 44D which is provided between the second thread part 44A and the second shank 44C. The second thread part 44A is configured by a external thread which is complementary to the second bearing 43. The second screw mechanism 46 allows the second pin 44 to progress and retreat with respect to the second bearing portion 43. The second cam portion 44B and the second stopper 44D comprise the second retaining portion 48. The second retaining portion 48 prevents the second pin 44 from falling off the second bearing 43 when progressing and retreating.

The second cam portion 44B is provided eccentrically with respect to the center axis 44E of the second pin 44. The second cam portion 44B is plate-shaped. The second cam portion 44B has a second chamfered portion 49, which is formed by chamfering the edge of the surface facing the second aperture 45. The second cam portion 44B engages with the second aperture 45.

As shown in FIG. 11, the second concave portion 47 is formed concavely with respect to the anterior surface 17A of the fixing portion 17. The depth of the second concave portion 47 is approximately the same as the height of the second cam portion 44B. The second bearing 43 is arranged at the bottom of the second concave portion 47. Therefore, as shown in the chain double-dashed line in FIG. 11, when the second pin 44 progresses and the second cam portion 44B disengages from the second aperture 45, the second concave portion 47 accommodates the second cam 44B.

Subsequently, the assembly process of the flat-screen television 61 will be explained with reference to FIG. 12. Firstly, the body 12 is placed on the upper part of the stand 13, and the hook mechanism 15 of the body 12 is hooked on the upper side of the fixing portion 17. After roughly positioning the body 12 on the stand 13 in this manner, each of the five pieces of screws 28 temporary hold the through-holes 53 provided on, for instance, five locations on the fixing portion 17 and the frame 21. For instance, a minus screwdriver is inserted into the first groove 34F of the first pin 34 in order to rotate the first pin 34, thereby actuating the first positioning portion 63.

For example, when the first pin 34 is rotated clockwise, the first pin 34 retreats toward the back of the flat-screen television 61 while rotating about the center axis 34E. In such manner, the first cam portion 34B of the first pin 34 engages with the first aperture 35 of the body 12. Subsequently, when the second pin 44 is rotated, for instance, clockwise, the second pin 44 retreats toward the back of the flat-screen television 61 while rotating about the center axis 44 E. When the second cam portion 44B of the second pin 44 engages with the second aperture 45 of the body 12, the first positioning portion 63 and the second positioning portion 64 determines the position of the body 12 on the stand 13.

As illustrated by the chain double-dashed line in FIG. 11, when the second cam portion 44B of the second pin 44 is inserted into the second aperture 45, the first pin 34 functions as a pivot point to rotate the body 12 in a predetermined angle. The user adjusts the second pin 44 to a desired position in order to level the body 12. The first and second positioning portions 63 and 64 determine the position of the body 12 on the stand 13 in a state where the body 12 is modified horizontally by a predetermined angle rotation. Lastly, the five pieces of screws 28 are fully inserted, thereby terminating the assembly process.

Meanwhile, when detaching the body 12 from the stand 13, they may be disassembled by following the opposite procedure of the above. In other words, by rotating the first pin 34, for instance, counter-clockwise, the first cam portion 34B can be disengaged from the first aperture 35 while rotating about the center axis 34E. For instance, when the second pin 44 is rotated counter-clockwise, the second cam portion 44B can be disengaged from the second aperture 45 while rotating about the center axis 44E.

According to the second embodiment, the adjustment system 62 comprises the first positioning portion 63 which determines the position of the body 12 on the stand 13, and the second positioning portion 64 which is provided independent from the first positioning portion 63, makes the first positioning portion 63 function as a pivot point to rotate the body 12 in a predetermined angle with respect to the stand 13, and determines the position of the body 12 on the stand 13 in a state of such rotation. According to this structure, the first positioning portion 63 and the second positioning portion 64 are capable of determining the position of the body 12 on the stand 13 and adjusting the angle of the body 12. Therefore, the structure may be simplified without needing to provide a function separately to adjust the angle of the body 12.

The second embodiment is different from the first embodiment in that it can determine the position and adjust the mounting angle of the body 12 likewise the first embodiment by providing the first bearing 33, the first pin 34, the second bearing 43 and the second pin 44 on the body 12, and providing the first aperture 35 and the second aperture 45 on the stand 13. Further, in the second embodiment, the first and second pins 34 and 44 and the screw 28 for fixing are exposed through the aperture 27, toward the front of the flat-screen television 61. Therefore, it is preferred that a decorative laminate, which is not illustrated, be provided in order to hide the heads of the first and the second pins 34 and 44 and the screw 28.

The display device of the present invention can be exercised not only for the flat-screen television 11 and 61, but also for, such as, displays for personal computers. Furthermore, in the above embodiment, the first screw mechanism 36 and the second screw mechanism 46 are provided. However, this is not restricted, and the first pin 34 and the second pin 44 may be configured as pins which can progress and retreat simply about the axis. The display device may also be exercised under various modifications which do not exceed the subject-matter of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device comprising:
a body;
a stand to support the body; and an adjustment system, provided between the body and the stand, that is configured to adjust the tilt of the body, the adjustment system comprising;

a first bearing provided on one of the body and the stand, a first pin which penetrates through the first bearing and can progress and retreat in an axial direction, a first aperture, provided on the other one of the body and the stand, to insert the first pin, a first cam portion, provided on the first pin that is concentric with a central axis of the first pin, the first cam portion engaging with and disengaging from the first aperture while rotating about the central axis, a second bearing provided on one of the body and the stand, a second pin which penetrates through the second bearing and is configured to progress and retreat in an axial direction, a second aperture provided on the other one of the body and the stand to insert the second pin, and a second cam portion, provided on the second pin that is eccentric with respect to a central axis of the second pin, the second cam portion engaging with and disengaging from the second aperture while rotating about the central axis.

2. The display device according to claim 1, wherein the first cam portion is formed in a shape where an edge of a surface facing the first aperture is chamfered.

3. The display device according to claim 2, wherein the second cam portion is formed in a shape where an edge of a surface facing the second aperture is chamfered.

4. The display device according to claim 3, wherein the first positioning portion comprises a first screw mechanism which is provided between the first pin and the first bearing; the first screw mechanism having the first pin progress and retreat with respect to the first bearing.

5. The display device according to claim 4, wherein the second positioning portion comprises a second screw mechanism which is provided between the second pin and the second bearing, the second screw mechanism having the second pin progress and retreat with respect to the second bearing.

6. The display device according to claim 5, wherein the first positioning portion comprises a first concave portion with the first bearing arranged at the bottom, a depth of the first concave portion being approximately the same as the height of the first cam portion.

7. The display device according to claim 6, wherein the second positioning portion comprises a second concave portion with the second bearing arranged at the bottom, a depth of the second concave portion being approximately the same as the height of the second cam portion.

8. The display device according to claim 7, wherein the first pin includes a first retaining portion, the first retaining portion preventing the first pin from falling off the first bearing.

9. The display device according to claim 8, wherein the second pin includes a second retaining portion, the second retaining portion preventing the second pin from falling off the second bearing.

10. The display device according to claim 1, wherein the body comprises a front cover and a back cover, the back cover being arranged apart from the first positioning portion and the second positioning portion.

* * * * *